US012564897B2

(12) United States Patent
Oh

(10) Patent No.: US 12,564,897 B2
(45) Date of Patent: Mar. 3, 2026

(54) SPOT WELDING METHOD FOR MULTI-LAYERS AND SPOT WELDING APPARATUS USING THE SAME

(71) Applicants: HYUNDAI MOTOR COMPANY, Seoul (KR); KIA CORPORATION, Seoul (KR)

(72) Inventor: Kyu-Hwan Oh, Sokcho-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 974 days.

(21) Appl. No.: 17/532,897

(22) Filed: Nov. 22, 2021

(65) Prior Publication Data

US 2023/0049894 A1 Feb. 16, 2023

(30) Foreign Application Priority Data

Jul. 12, 2021 (KR) ........................ 10-2021-0091261

(51) Int. Cl.
*B23K 11/11* (2006.01)
*B23K 11/00* (2006.01)
*B23K 11/30* (2006.01)
*B23K 101/00* (2006.01)

(52) U.S. Cl.
CPC ........... B23K 11/115 (2013.01); B23K 11/002 (2013.01); B23K 11/3009 (2013.01); *B23K 2101/006* (2018.08)

(58) Field of Classification Search
CPC ....... B23K 11/115; B23K 11/20; B23K 11/24; B23K 11/30; B23K 11/3009; B23K 11/3054; B23K 20/02; B23K 35/0261; B23K 9/121; B23K 9/285
USPC .................................................. 219/202, 91.2
See application file for complete search history.

(56) References Cited

U.S. PATENT DOCUMENTS

| | | | | |
|---|---|---|---|---|
| 8,357,870 | B1 * | 1/2013 | Edwards, II | .......... B23K 11/115 |
| | | | | 219/78.01 |
| 8,742,294 | B2 * | 6/2014 | Fukuda | .................. B23K 9/232 |
| | | | | 219/136 |
| 9,073,146 | B2 * | 7/2015 | Sakai | ..................... B23K 11/115 |
| 10,081,071 | B2 * | 9/2018 | Furusako | ........... B23K 35/0261 |
| 10,252,370 | B2 * | 4/2019 | Fukumoto | .............. B23K 11/16 |
| 10,279,418 | B2 * | 5/2019 | Edwards, II | ........... B23K 11/24 |
| 10,625,368 | B2 * | 4/2020 | Sawanishi | ............. B23K 11/255 |
| 11,351,625 | B2 * | 6/2022 | Toyoda | ................... B23K 11/11 |

(Continued)

FOREIGN PATENT DOCUMENTS

| | | |
|---|---|---|
| KR | 100526413 B1 | 11/2005 |
| KR | 101585549 B1 | 1/2016 |

(Continued)

OTHER PUBLICATIONS

English translation of WO-2015133099-A1 (Year: 2015).*

*Primary Examiner* — Chris Q Liu
(74) *Attorney, Agent, or Firm* — Lempia Summerfield Katz LLC

(57) ABSTRACT

A welding method and a welding apparatus using the same control heat emission amounts of interfaces of a welding subject to be similar by adjusting cross-sectional areas of two welding tips arranged on both outer facing surfaces of a panel type welding subject, superimposed in multi-layers, to simultaneously form a nugget diameter.

4 Claims, 5 Drawing Sheets

(56)    References Cited

U.S. PATENT DOCUMENTS

| | | | | |
|---|---|---|---|---|
| 2008/0241572 A1* | 10/2008 | Miyamoto | ............ | B23K 11/115 |
| | | | | 219/118 |
| 2009/0302010 A1* | 12/2009 | Goto | ...................... | B23K 11/16 |
| | | | | 219/117.1 |
| 2010/0044349 A1* | 2/2010 | Yoo | ...................... | B23K 11/185 |
| | | | | 219/118 |
| 2010/0243616 A1* | 9/2010 | Goto | ................... | B23K 11/115 |
| | | | | 219/119 |
| 2011/0097594 A1* | 4/2011 | Tanaka | ................. | B23K 11/166 |
| | | | | 219/86.22 |
| 2013/0327745 A1* | 12/2013 | Chen | ...................... | B23K 11/00 |
| | | | | 219/117.1 |
| 2015/0174690 A1* | 6/2015 | Furusako | ............. | B23K 11/241 |
| | | | | 219/91.22 |
| 2017/0312846 A1* | 11/2017 | Sawanishi | ............. | B23K 11/115 |

FOREIGN PATENT DOCUMENTS

| | | | | |
|---|---|---|---|---|
| KR | 20170134275 A | 12/2017 | | |
| KR | 102063168 B1 | 1/2020 | | |
| WO | WO-2015133099 A1 * | 9/2015 | ............. | B23K 11/11 |

* cited by examiner

FIG. 1 - Prior art
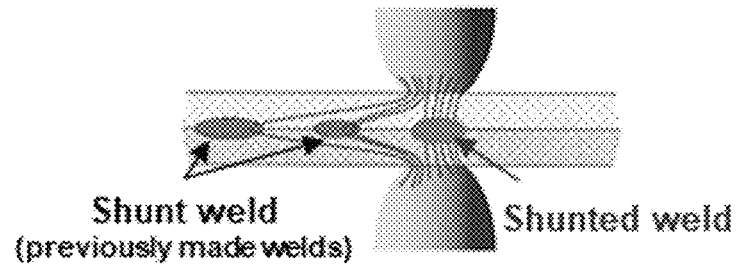
FIG. 2 - Prior Art
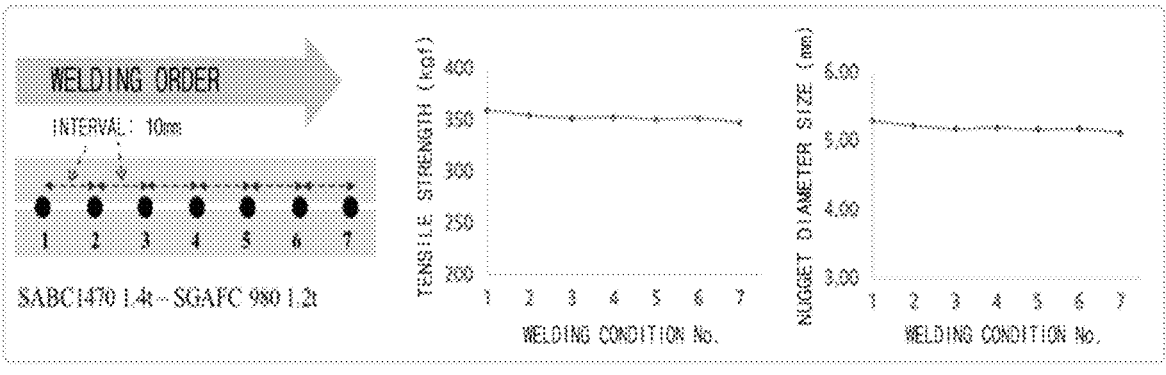

FIG. 3 - Prior Art
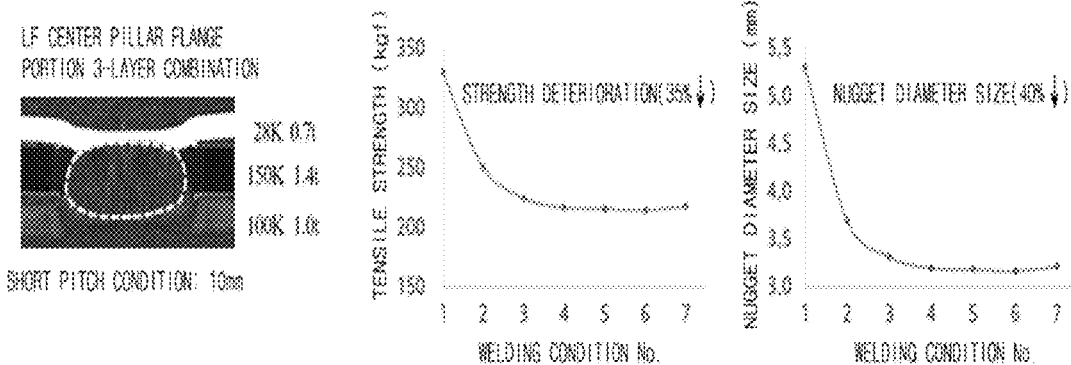
FIG. 4 - Prior Art
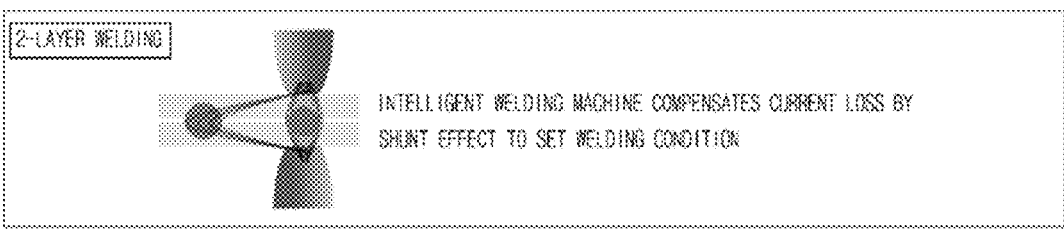
FIG. 5 - Prior Art
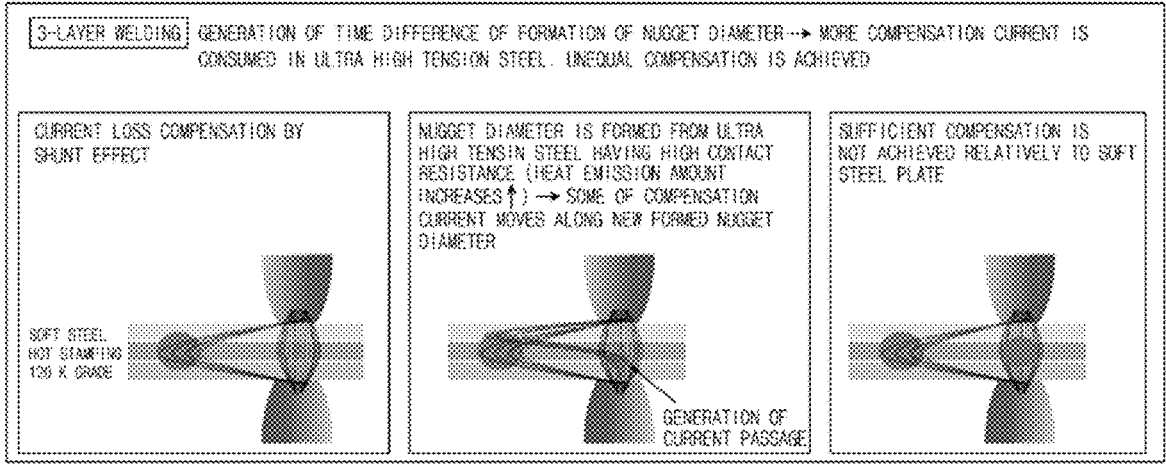

FIG. 10A
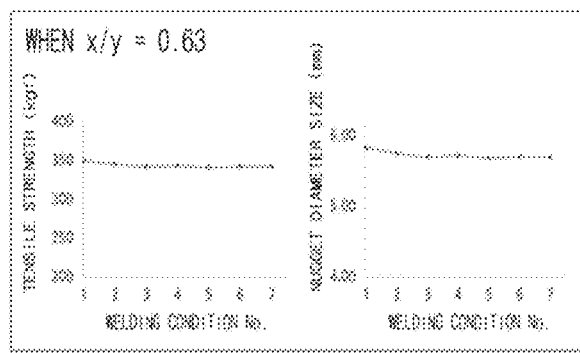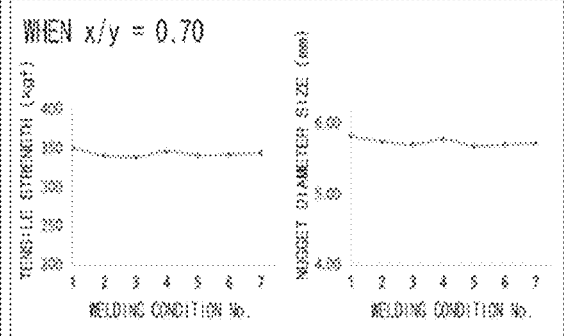
FIG. 10B
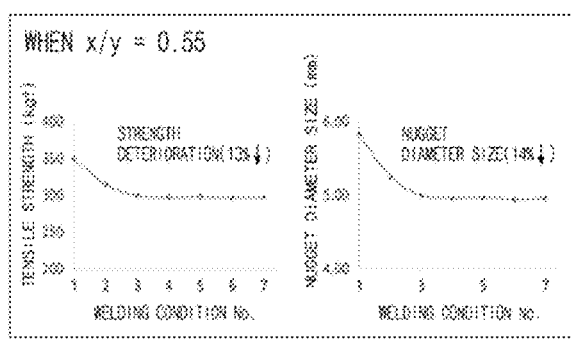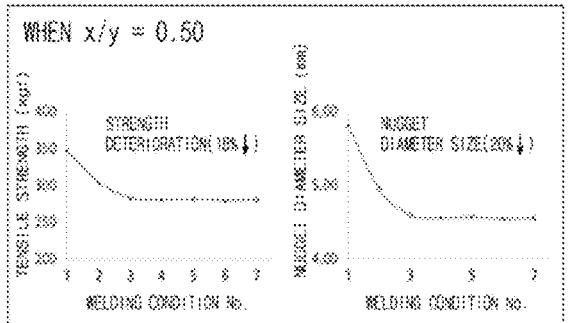
FIG. 10C
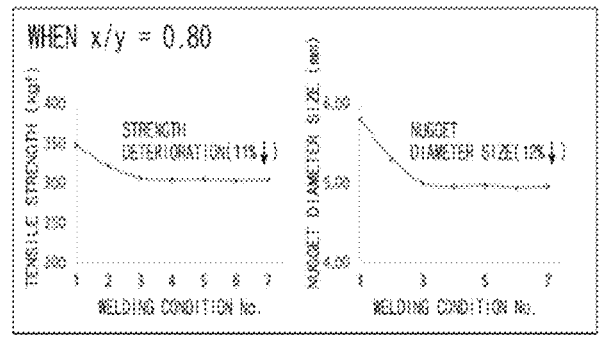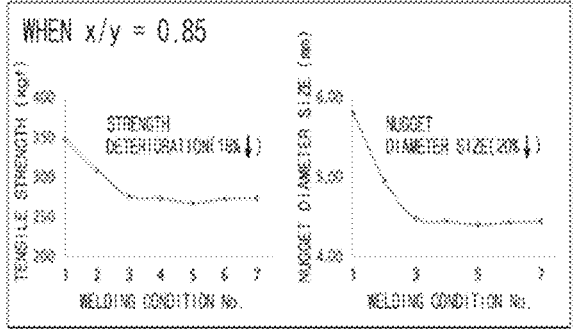

SPOT WELDING METHOD FOR MULTI-LAYERS AND SPOT WELDING APPARATUS USING THE SAME

CROSS-REFERENCE TO RELATED APPLICATIONS

This application claims priority under 35 U.S.C. § 119 to Korean Patent Application No. 10-2021-0091261, filed on Jul. 12, 2021, in the Korean Intellectual Property Office, the disclosure of which is incorporated herein by reference in its entirety.

BACKGROUND

1. Field of the Disclosure

The present disclosure relates to a welding method capable of multi-layer welding through adjustment of a cross-sectional area of a welding tip and a welding apparatus using the same. More particularly, the present disclosure relates to a welding method and apparatus, which simultaneously form a nugget diameter by controlling heat emission amounts of interfaces of welding subjects to be similar. This is done by adjusting cross-sectional areas of two welding tips arranged on both outer facing surfaces of a panel type welding subject, which are superimposed in multi-layers.

2. Description of the Related Art

There have been various attempts to improve welding quality or capability by improving a welding tip in the related art.

As an example, Korean Patent Registration No. 10-0526413 ("Manufacturing Method of Spot Welding Electrode Tip") relates to a manufacturing method of a composite spot welding electrode tip, which solidly couples and fixes a stiffener composed of a dispersed reinforced copper alloy, in which fine particles of a metal oxide are dispersed in a base of a copper material, to a fore end of a body composed of a precipitative hardening copper alloy having high conductivity. In particular, this technology provides an advantage that the reinforced material is coupled and fixed by using a punch and a mold, and as a result, workability and productivity are excellent.

Further, Korean Patent Registration No. 10-1585549 ("Tip for Welding Apparatus and the Method Thereof") relates to a tip for a welding apparatus and a method thereof, which may directly bring and weld a head portion of a welding bolt in contact with a panel having a small thickness to remove an unnecessary work process, thereby enhancing work efficiency. This technology also may weld and fix the welding bolt to an accurate position to be welded, and particularly, support a fusion protrusion formed on a head of the welding bolt to contact a panel surface with a jig, and weld the welding bolt to the panel surface by supplying power through a tip at both sides of the jig to directly weld the welding bolt to the panel without a separate welding preparation process such as spot welding at a portion where the panel and the head portion of the welding bolt contact. This technology provides an advantage that separate pre-treatment processing according to welding may not be performed for the panel or the welding bolt by inserting the welding bolt into the jig, and then putting the welding bolt interposed between two tips for power supply and directly welding the welding bolt to the panel to be integrally formed.

Moreover, Korean Patent Registration No. 10-2017-0134275 ("Electric Resistance Spot Welding Machine with Double Composite Electrode Tips") relates to an electric resistance spot welding machine with double composite electrode tips, which melts a contact surface at a predetermined position between metal plates while superimposing metal plates made of different materials to weld both metal plates. Particularly, this technology relates to an electric resistance spot welding machine, which has a first metal plate and a second metal plate that are superimposed to be positioned and includes a spot welding rod of which one end has an electrode, which contacts the metal plate and performs spot welding. The spot welding rod includes a rod-shaped first spot welding support rod receiving power from a first power supply unit, a rod-shaped second spot welding support rod receiving the power from a second power supply unit and accommodating the first spot welding support rod to be spaced apart therein, a first electrode tip coupled to an end of the first spot welding support rod, and a second electrode tip coupled to the end of the second spot welding support rod and accommodating the first electrode therein. This technology provides an advantage of being capable of adjusting spot weldability of heterogeneous metal plates and easily performing the spot welding for the heterogeneous metal plates according to a difference in an amount of current supplied to each electrode tip by differently controlling an amount of current supplied to each electrode tip constituting the double composite electrode tips.

Furthermore, Korean Patent Registration No. 10-2063168 ("Structure of Electrode Tip for Spot Welding Equipment") relates to a structure of an electrode tip for spot welding equipment which enables spot welding even at a welding portion having a small width, such as a flange of a door frame. Particularly, this technology relates to a spot welding equipment in which an end of an electrode tip is closed, attached, and pressed to both lateral surfaces of a plate and wherein current is electrically conducted to the electrode tip and a nugget is formed on a contact surface between the plates to contact the plates each other. A top end of the electrode tip is coupled to a fore end of a shank in which cooling water is circulated and a contact surface extending downward with a predetermined length and formed in a plane on a lower end contacts the plate. The contact surface is formed in an area smaller than an outer diameter of the top end of the electrode tip. As a result, the contact surface of the lower end of the electrode tip contacting a plate to be welded has a smaller area than an upper portion. This results in enabling the spot welding even in a small width such as a vehicular door flange to provide an effect of a wide use range and an effect of saving device operation cost by reducing an end abrasion phenomenon of the electrode tip by increasing heat dissipation efficiency of the electrode tip by inserting a guide member providing a movement path of the cooling water into the electrode tip.

However, the prior art contains technologies which improve a welding quality by adjusting cross-sectional areas of two welding tips arranged on superimposed panels, in particular, both facing outer surfaces of a panel type welding subject superimposed in multi-layers.

SUMMARY

The present disclosure has been made in an effort to provide a welding method and a welding apparatus using the same, which control heat emission amounts of interfaces of a welding subject to be similar by adjusting cross-sectional areas of two welding tips arranged on both outer facing surfaces of a panel type welding subject superimposed in multi-layers to simultaneously form a nugget diameter.

Further, the present disclosure has been made in an effort to provide a welding method capable of multi-layer welding through adjustment of a cross-sectional area of a welding tip and a welding apparatus using the same, in which a ratio (x/y) of cross-sectional areas of two welding tips satisfies a specific equation which is a function of a thickness and resistivity of a welding subject.

Further, the present disclosure has been made in an effort to provide a welding method capable of multi-layer welding through adjustment of a cross-sectional area of a welding tip and a welding apparatus using the same, in which in the specific function equation, the ratio (x/y) of the cross-sectional areas of the welding tips has an allowable value of ±20%, or an allowable value of ±10%.

Moreover, the present disclosure has been made in an effort to provide a welding method capable of multi-layer welding through adjustment of a cross-sectional area of a welding tip and a welding apparatus using the same, in which a pitch which is an interval between welding spots is a short pitch in the range of 10 to 30 mm and the number of welding subjects is 3 or more.

An embodiment of the present disclosure provides a welding method capable of multi-layer welding through adjustment of a cross-sectional area of a welding tip, in which heat emission amounts of interfaces of welding subjects are controlled to be similar by adjusting cross-sectional areas of two welding tips arranged on both outer facing surfaces of a panel type welding subject superimposed in multi-layers to simultaneously form a nugget diameter.

Further, in the intelligent welding method capable of multi-layer welding through adjustment of a cross-sectional area of a welding tip, a ratio (x/y) of the cross-sectional areas of two welding tips may satisfy the following equation, which is a function of a thickness and resistivity of the welding subject, and the ratio (x/y) of the cross-sectional areas of the welding tips may have an allowable value of ±20%.

$$\frac{x}{y} = f(\rho_i, t_i)$$

Here, p represents resistivity of each layer of the welding subject, t represents a thickness of each layer of the welding subject, and i as the number of welding subjects is a natural number of 2 or more.

Furthermore, in the intelligent welding method capable of multi-layer welding through adjustment of a cross-sectional area of a welding tip, the ratio (x/y) of the cross-sectional areas of the welding tips may have an allowable value of ±10%, a pitch which is an interval between welding spots may be a short pitch in the range of 10 to 30 mm, and the number of welding subjects may be 3 or more.

Further, a welding apparatus is configured by the intelligent welding method capable of multi-layer welding through adjustment of a cross-sectional area of a welding tip.

According to embodiments of the present disclosure, a welding method is provided that is capable of multi-layer welding through adjustment of a cross-sectional area of a welding tip and a welding apparatus is provided using the same control heat emission amounts of interfaces of a welding subject to be similar by adjusting cross-sectional areas of two welding tips arranged on both facing outer surfaces of a panel type welding subject superimposed in multi-layers to simultaneously form a nugget diameter. The welding method and apparatus provided herein are capable of short-pitch (a pitch between welding spots is a short pitch in the range of 10 to 30 mm) welding and high-quality spot welding of a panel type welding subject of multi-layers, in particular, three-layers or more. The welding method and apparatus provided herein can fundamentally solve a critical problem in that vehicle collision capability deficiency occurs due to an increase in vehicle body deformation amount caused by welding point interface breakage (occurring when nugget diameter is insufficient) and button breakage of a real side portion during Insurance Institute for Highway Safety (IIHS) small overlap and side collision tests when multi-layer welding of a steel plate for a vehicle is used.

BRIEF DESCRIPTION OF THE DRAWINGS

FIG. 1 is a conceptual diagram for describing a shunt effect.

FIG. 2 is a graph of a welding machine in the related art when two-layer short pitch (10 mm pitch is applied) welding is applied and illustrates that the welding machine compensates calories loss by a shunt effect.

FIG. 3 is a graph of the welding machine in the related art when three-layer short pitch (10 mm pitch is applied) welding is applied and illustrates that strength deteriorates and nugget diameter decreases by the shunt effect.

FIGS. 4 and 5 illustrate compensations of shunt effects when the welding machine in the related art is applied to two-layer welding and three-layer welding.

FIGS. 10A-10C are graphs showing a tensile strength and a nugget diameter size according to a welding tip ratio in Example 1.

DETAILED DESCRIPTION OF THE EMBODIMENTS

Figure 6:
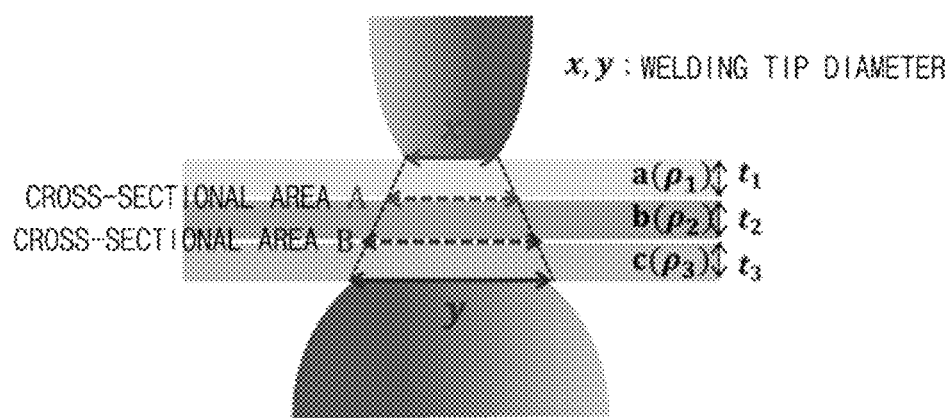
FIG. 6 is the conceptual diagram of the three-layer welding.

Hereinafter, a welding method capable of multi-layer welding through adjustment of a cross-sectional area of a welding tip and a configuration of a welding apparatus using the same according to the present disclosure are described in detail with reference to drawings.

However, the drawings are provided as an example for allowing those having ordinary skill in the art to sufficiently appreciate the spirit of the present disclosure. Accordingly, the present disclosure is not limited to drawings presented below but may be embodied in other aspects.

In addition, unless otherwise defined, the terms used in the description of the present disclosure have the same meaning as commonly understood by those having ordinary skill in the art to which the present disclosure belongs. In the following description and the accompanying drawings, a detailed description of known functions and configurations that may unnecessarily obscure the gist of the present invention have been omitted.

The present disclosure is basically contrived to provide a welding method capable of spot welding of multi layers, in particular, multiple steel plates for a vehicle and a welding apparatus using the same.

During Existing Insurance Institute for Highway Safety (IIHS) Small Overlap and Side Crash Test, there is a problem in that collision capability deficiency, i.e., reduced or poor crashworthiness, occurs due to an increase in vehicle body deformation caused by real side portion welding point interface breakage (occurring when nugget diameter is insufficient) and button breakage. As a result, there are many cases in which retest is performed by adding a welding point and structure adhesive. Further, since high cost is incurred for advance confirmation and test cost for a retest vehicle, an improvement measure therefor is required.

In general, in order to improve a collision capability, a lot of welding points should be secured by reducing a welding pitch interval, but it is difficult to increase the number of welding points because of a shunt effect.

FIG. 1 is a conceptual diagram for describing a shunt effect. As illustrated in FIG. 1, when a shunt effect occurs in which welding current flows at a place which is not related to a welding portion, a heat emission amount used for welding is reduced due to a decrease in current actually transmitted to the welding portion, and as a result, a welding strength deteriorates.

As a resolution for this problem, current and calories lost by the shunt effect may be supplemented by purchasing and using various welding machines. But in this case, only two-layer welding is generally possible. As a result, a fundamental solution may not be provided by a known welding machine in that most general collision members are welding of 3 layers or more.

Therefore, in the related art, a welding machine that adopts a scheme of supplementing the current and the calories according to a resistance pattern by the shunt effect is used.

Specifically, the welding machine in the related art is applicable to two-layer welding during short pitch (30 mm) welding. However, it is impossible to apply the welding machine in the related art during welding of 3 layers or more by a difference in contact resistance between interfaces. Such a problem becomes more significant in a short pitch of, in particular, less than 30 mm, and more specifically, a 10 mm level.

Calorie loss compensation and limitations of the welding machines in the related art may be confirmed through the graphs of FIGS. 2 and 3.

FIG. 2 is a graph of a welding machine in the related art when two-layer short pitch (10 mm pitch is applied) welding is applied. FIG. 2 illustrates that the welding machine compensates calorie loss by a shunt effect.

Further, FIG. 3 is a graph of the welding machine in the related art when three-layer short pitch (10 mm pitch is applied) welding is applied FIG. 3 illustrates that strength deteriorates and nugget diameter decreases because of the shunt effect.

Similarly, in respect to a reason why current compensation is not achieved in the three-layer welding in the welding machine in the related art, when a time difference of formation of a nugget diameter occurs due to an interface resistance difference, current compensation is not equally achieved and unequal compensation is achieved according to a contact surface. As a result, it is determined that it is impossible to apply the three-layer welding.

FIGS. 4 and 5 illustrate compensation of the shunt effect when the welding machine in the related art is applied to two-layer welding and three-layer welding.

In other words, as illustrated in FIG. 4, a welding condition may be set so that the intelligent welding machine compensates the current loss by the shunt effect when the welding machine in the related art is applied to the two-layer welding. As illustrated in FIG. 5, the time difference occurs in forming the nugget diameter when the welding machine in the related art is applied to the three-layer welding. In particular, more compensation current is consumed in super high tension steel and, as a result, a larger unequal compensation is generated.

In the present disclosure, in order to resolve such a problem, a method is devised in which the nugget diameter is simultaneously formed by controlling heat emission amounts of the interfaces to be similar during multi-layer welding. The method does so through adjustment of cross-sectional areas of two welding tips arranged on both outer facing surfaces of a panel type welding subject to enable equal calorie compensation between the contact surfaces.

Here, a heat emission amount during welding is in proportion to resistance of a steel plate as shown in Equation 1 below.

$$P(\text{Calories}) = \qquad\qquad\qquad\qquad\qquad \text{(Equation 1)}$$

$$VI = I^2R \longrightarrow R \propto \frac{\rho}{A} \begin{cases} \rho: \text{Resistivity} \\ A: \text{Cross-sectional area} \end{cases}$$

Further, referring to the conceptual diagram of the three-layer welding in FIG. 6, resistivity between interfaces according to a cross-sectional area of the welding tip during the three-layer welding may be calculated as follows.

Referring to FIG. 6, a diameter of cross-sectional area A is $$\frac{x(t_2 + t_3) + yt_1}{t_1 + t_2 + t_3}$$

and a diameter of cross-sectional area B is $$\frac{xt_3 + y(t_1 + t_2)}{t_1 + t_2 + t_3},$$

so resistivity of cross-sectional area A and cross-sectional area B is as follows.

Resistivity in cross-sectional area A: average of resistivity of materials a and b $$\frac{\rho_1 + \rho_2}{2}$$

Resistivity in cross-sectional area B: average of resistivity of materials a and b $$\frac{\rho_2 + \rho_3}{2}$$

Equation 2 below should be satisfied so that heat emission amounts of cross-sectional area A and cross-sectional area B are equal to each other.

value of ±20%, or an allowable value of ±10% as in Equation 4 below.

(Equation 2)

$$R \propto \frac{\rho \longrightarrow}{A \longrightarrow} = \frac{\dfrac{\rho_1 + \rho_2}{2}}{\left(\dfrac{x(t_2 + t_3) + yt_1}{t_1 + t_2 + t_3}\right)^2} = \frac{\dfrac{\rho_2 + \rho_3}{2}}{\left(\dfrac{xt_3 + y(t_1 + t_2)}{t_1 + t_2 + t_3}\right)^2} \tag{1}$$

$$0.9 \times f(\rho_i, t_i) \le \frac{x}{y} \le 1.1 \times f(\rho_i, t_i) \quad i = 1, 2, 3 \qquad \text{(Equation 4)}$$

Here, when both sides of Equation 2 above are organized, $(p_1+p_2)(xt_3+y(t_1+t_2))^2-(p_2+p_3)(x(t_2+t_3)+yt_1)^2=0x^2(t_3^2$
$(p_1+\!p_2)-(p_2+p_3)(t_2+t_3)^2)-t_1^2y^2(p_2+p_3)-y^2(p_1+$
$p_2)(t_1+t_2)^2+x(2t_3y(p_1+p_2)(t_1+t_2)-2t_1y(p_2+p_3)(t_2+$
$t_3))=0,$ and in a relational equation of cross-sectional areas of two welding tips arranged on both facing outer surfaces of the panel type welding subject superimposed in multi-layers, a ratio (x/y) of the cross-sectional areas of two welding tips is organized as Equation 3. Equation 3 is a function of a thickness and resistivity of the welding subject.

In general, the shunt effect occurs when an internal between welding points is smaller than 30 mm, and as a result, the shunt effect becomes more severe as a pitch interval becomes smaller. A limitation of short pitch welding due to sizes of the welding tips and the nugget diameter is approximately 10 mm.

According to the present disclosure, in respect to the panel type welding subject superimposed in multi-layers, in particular, three layers or more steel plates, it is possible to secure an equal welding quality (tensile strength and nugget diameter size) which is irrespective of the shunt effect when the steel plate is applied to short pitch welding of an interval of 10 to 30 mm.

Figure 8:
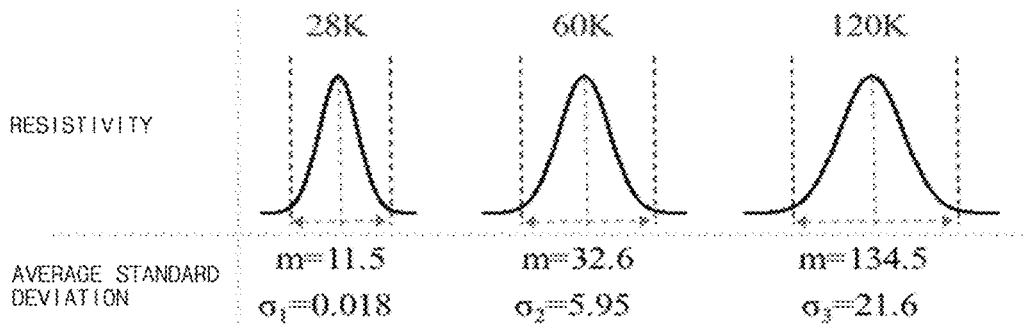
FIG. 8 is a graph of resistivity scattering according to a material strength.

Further, referring g to the graph of resistivity scattering according to a material strength of FIG. 8, it can be seen that, (Equation 3)

$$\begin{aligned} = \{ & -2t_3(\rho_1 + \rho_2)(t_1 + t_2) + 2t_1(\rho_2 + \rho_3)(t_2 + t_3) \\ \pm & \sqrt{\begin{aligned} &(2t_3(\rho_1 + \rho_2)(t_1 + t_2) - 2t_1(\rho_2 + \rho_3)(t_2 + t_3))^2 - 4(t_3^2(\rho_1 + \rho_2) - \\ &(\rho_2 + \rho_3)(t_2 + t_3)^2)(-t_1^2(\rho_2 + \rho_3) - (\rho_1 + \rho_2)(t_2 + t_2)^2) \end{aligned}} \} \\ / & \ \{ 2(t_3^2(\rho_1 + \rho_2) - (\rho_2 + \rho_3)(t_2 + t_3)^2) \} \end{aligned}$$

$$\mathrel{\llcorner} \frac{x}{y} = f(\rho_i, t_i) \quad i = 1, 2, 3$$

(2)

In Equation 3, ρ represents resistivity of each layer of the welding subject and t represents a thickness of each layer of the welding subject. Since the present disclosure relates to the panel type welding subject superimposed in multi-layers, i as the number of welding subjects is a natural number of 2 or more.

Furthermore, resistivity of the panel type welding subject, in particular, a steel plate, is in proportion to a carbon equivalent. Thus, the resistivity has characteristics shown in a resistivity-strength (K grade) proportional graph shown in FIG. 7.

Figure 7:
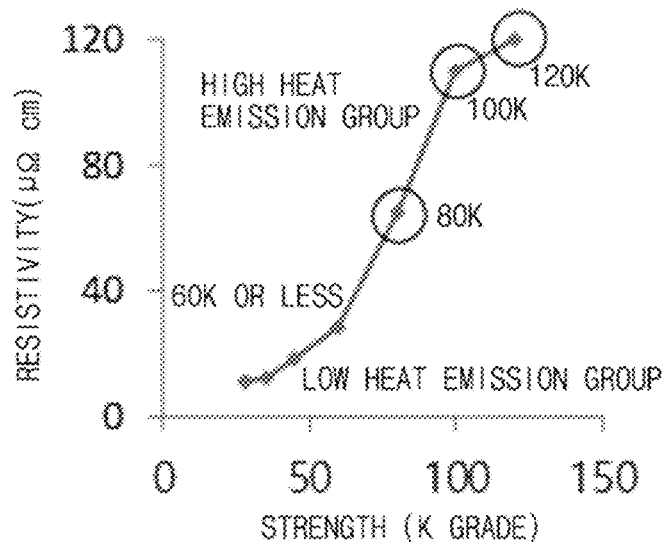
FIG. 7 is proportional graph shown in a resistivity-strength (K grade).

As in the graph of FIG. 7, resistivity rapidly increases from an 80K grade strength steel plate. A low heat emission group is soft steel to 60 K grade steel plate, and a high heat emission group is a steel plate of an 80 K grade or more (including hot stamping). As a result, it may be that the heat emission amount used is in proportion to the resistivity and the resistivity is in proportion to a material carbon equivalent.

Meanwhile, resistivity $\rho=10.7+0.61\exp(C_{eq}/0.12)$.

Therefore, a ratio of sizes of two welding tips is determined by Equation 3 described above, so the ratio of the sizes of the welding tips may be represented as a function of a thickness and resistivity of a steel plate and the resistivity of the steel plate increases according to the strength.

In this case, an average value of the resistivity of the steel plate universally used is shown in the above graph.

Furthermore, by considering scattering of the resistivity of the steel plate, the ratio of Equation 3 has an allowable as the strength of the panel type welding subject, i.e., the steel plate increases, the resistivity scattering increases.

Figure 9:
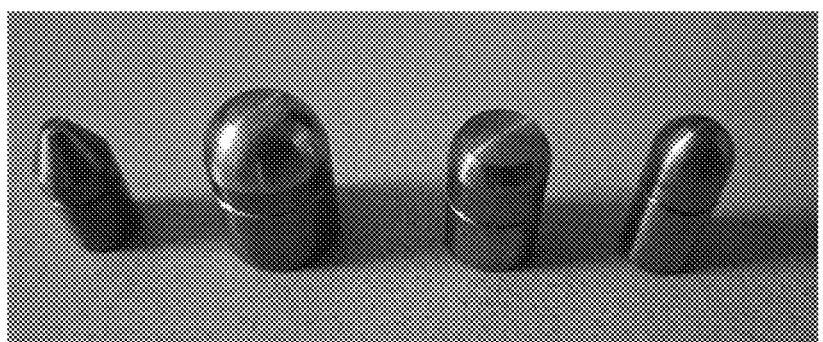
FIG. 9 is a photo diagram of various welding tips.

FIG. 9 is a photo diagram of various welding tips in the related art. The present disclosure provides a welding method capable of multi-layer welding through adjustment of a cross-sectional area of the welding tip. In particular, heat emission amounts of interfaces of the welding subject are controlled to be similar by adjusting cross-sectional areas of two welding tips arranged on both outer facing surfaces of the panel type welding subject superimposed in multi-layers to simultaneously form the nugget diameter.

Further, in the welding method of the present disclosure, the ratio (x/y) of the cross-sectional areas of two welding tips satisfies Equation 3 above, which is the function of the thickness and the resistivity of the welding subject. Also, the ratio (x/y) of the cross-sectional areas of the welding tips may have an allowable value of ±20%.

Furthermore, in the welding method of the present disclosure, the ratio (x/y) of the cross-sectional areas of the welding tips may have an allowable value of ±10%.

Moreover, in the welding method of the present disclosure, a pitch, which is an interval between welding spots, may be a short pitch in the range of 10 to 30 mm (10 or more and less than 30 mm).

Further, the number of welding subjects is 2 or more, and may be 2 to 5. The number of welding subjects may be 3 or more and in one example may be 3 to 5.

Further, the welding apparatus according to the present disclosure is achieved by applying the welding method.

The present disclosure may be better appreciated through the following example.

[Example 1: 28 K (8 mm)–150K (12 mm)–100 K (10 mm) three-layer welding, pitch interval of welding spots of 10 mm]

In this case, in Example 1, an appropriate range of the ratio (x/y) of the cross-sectional areas of the welding tips is $$0.60 \le \frac{x}{y} \le 0.73.$$

FIGS. 10A-10C are graphs showing a tensile strength and a nugget diameter size according to a welding tip ratio in Example 1. Referring to the graph of FIG. 10A, when the ratio of the welding tip is in an appropriate welding tip ratio range, an equal welding quality within a deviation of 5% could be secured.

However, referring to the graph of FIG. 10B, when the ratio of the welding tip is smaller than the appropriate tion 3 above is used, it can be seen that an equal and robust welding quality may be secured even in most severe 10 mm short-pitch welding.

[Example 2: Range of ratio (x/y) of cross-sectional areas of the welding tips according to a thickness ratio and strength of three-layer superimposed panel type welding subject in which the number of welding subjects is three (A, B, and C), and in particular, a steel plate]

In Example 2 above, the appropriate range of the ratio (x/y) of the cross-sectional areas of the welding tip, in which the equal welding quality within the deviation of 5%, may be secured according to a thickness ratio and strength of three-layer superimposed panel type welding subject. In Example 2, the number of welding subjects is three (A, B, and C), and in particular, the welding subject is a steel plate measured and shown as Tables 1-4.

TABLE 1

| A, B and C material thickness ratio | | | $t_1$:$t_2$:$t_3$ = 10:10:10 |
|---|---|---|---|
| Strength | | | Welding tip |
| A (resistivity ρ, μΩ cm) | B | C | ratio $\left(\dfrac{x}{y}\right)$ |
| 28K (11) | 150K (135) | 100K (110) | $0.54 \le \dfrac{x}{y} \le 0.66$ |
| 60K (28) | 150K (135) | 100K (110) | $0.65 \le \dfrac{x}{y} \le 0.80$ |
| 28K (11) | 150K (135) | 120K (120) | $0.50 \le \dfrac{x}{y} \le 0.61$ |
| 60K (28) | 150K (135) | 120K (120) | $0.61 \le \dfrac{x}{y} \le 0.75$ | welding tip ratio, the tensile strength deteriorates, and the size of the nugget diameter decreases.

Further, referring to the graph of FIG. 10C, when the ratio of the welding tip is larger than the appropriate welding tip ratio, the tensile strength deteriorates, and the size of the nugget diameter decreases.

In Example 1 above, as shown in FIG. 10A, a reason why, when the ratio (x/y) of the cross-sectional areas of the welding tips is smaller or larger than the appropriate ratio range, the strength deteriorates and the nugget diameter size decreases is that, as described with reference to FIG. 5, a purpose of an asymmetric welding method and a welding apparatus using the same according to the present disclosure is to equally compensate calories between contact surfaces A and B by controlling heat emission amounts of interfaces to be similar during multi-layer welding through adjustment of the size of the welding tip. Accordingly, when the range of the ratio (x/y) of the cross-sectional areas of the welding tips is large, a sufficient heat emission amount may not be generated on contact surface A. Also, when the ratio range is small, more heat emission amount in contact surface A is still generated than that in contact surface B. As a result, the heat emission amounts of the contact surfaces are unequal.

As such, when an intelligent welding method in which multi-layer welding is possible through adjustment of the cross-sectional areas of the welding tips. In other words, when the asymmetric welding tip is used, in the case of three-layer welding and 10 mm-short pitch welding, it can be seen that the tensile strength and the nugget diameter size have equal values within 5%.

In particular, when quality scattering of the steel plate is considered and the asymmetric welding tip based on Equa-

TABLE 2

| A, B, and C material thickness ratio $t_1$:$t_2$:$t_3$ = 8:10:10 | | | |
|---|---|---|---|
| Strength | | | Welding tip ratio |
| A | B | C | $\left(\dfrac{x}{y}\right)$ |
| 28K | 150K | 100K | $0.61 \le \dfrac{x}{y} \le 0.74$ |
| 60K | 150K | 100K | $0.73 \le \dfrac{x}{y} \le 0.90$ |
| 28K | 150K | 120K | $0.56 \le \dfrac{x}{y} \le 0.69$ |
| 60K | 150K | 120K | $0.69 \le \dfrac{x}{y} \le 0.84$ |

TABLE 3

| A, B, and C material thickness ratio $t_1$:$t_2$:$t_3$ = 8:12:10 | | | |
|---|---|---|---|
| Strength | | | Welding tip ratio |
| A | B | C | $\left(\dfrac{x}{y}\right)$ |
| 28K | 150K | 100K | $0.60 \le \dfrac{x}{y} \le 0.73$ |
| 60K | 150K | 100K | $0.72 \le \dfrac{x}{y} \le 0.89$ |

TABLE 3-continued

| A, B, and C material thickness ratio $t_1{:}t_2{:}t_3 = 8{:}12{:}10$ | | | |
|---|---|---|---|
| Strength | | | Welding tip ratio |
| A | B | C | $\left(\dfrac{x}{y}\right)$ |
| 28K | 150K | 120K | $0.56 \leq \dfrac{x}{y} \leq 0.68$ |
| 60K | 150K | 120K | $0.68 \leq \dfrac{x}{y} \leq 0.83$ |

A welding tip ratio of 28 K (8 mm)–150 K (12 mm)–100 K (10 mm) in Table 3 is a range of Example 1 described above.

TABLE 4

| A, B, and C material thickness ratio $t_1{:}t_2{:}t_3 = 7{:}14{:}10$ | | | |
|---|---|---|---|
| Strength | | | Welding tip ratio |
| A | B | C | $\left(\dfrac{x}{y}\right)$ |
| 28K | 150K | 100K | $0.62 \leq \dfrac{x}{y} \leq 0.76$ |
| 60K | 150K | 100K | $0.76 \leq \dfrac{x}{y} \leq 0.92$ |
| 28K | 150K | 120K | $0.58 \leq \dfrac{x}{y} \leq 0.71$ |
| 60K | 150K | 120K | $0.71 \leq \dfrac{x}{y} \leq 0.87$ |

The invention claimed is:

1. A method for welding a welding subject having multiple layers by spot welding, the method comprising:

determining a ratio (x/y) of a cross-sectional area (x) of a first welding tip arranged on an upper part of the welding subject and a cross-sectional area (y) of a second welding tip arranged on a lower part of the welding subject using the equation below in order to make the heat generation between each interface of the multiple layers of the welding subject similar so that nugget diameters are formed simultaneously, $$\frac{x}{y} = f(\rho_i, t_i);$$

wherein ρ represents resistivity of each layer of the welding subject, t represents a thickness of each layer of the welding subject, and i represents a number of the layers of the welding subject which is a natural number of 2 or more;

wherein the ratio (x/y) of the cross-sectional areas of the first welding tip and the second welding tip has an allowable value of ±10%;

arranging the first welding tip and the second welding tip having cross-sectional areas (x, y) satisfying the ration (x/y) on the upper and lower portions of the welding subject, respectively; and applying current to the arranged first welding tip and second welding tip to perform welding on the welding subject.

2. The method of claim 1, wherein the ratio (x/y) of the cross-sectional areas of the first and the second welding tips has an allowable value of ±20%.

3. The method of claim 1, wherein a pitch, which is an interval between welding spots, is a short pitch in a range of 10 to 30 mm.

4. The method of claim 1, wherein the number of the layers of the welding subject is 3 or more.

*   *   *   *   *